March 17, 1942. J. W. STEELE 2,276,746
WEED DIGGING AND GATHERING TOOL
Filed May 17, 1939
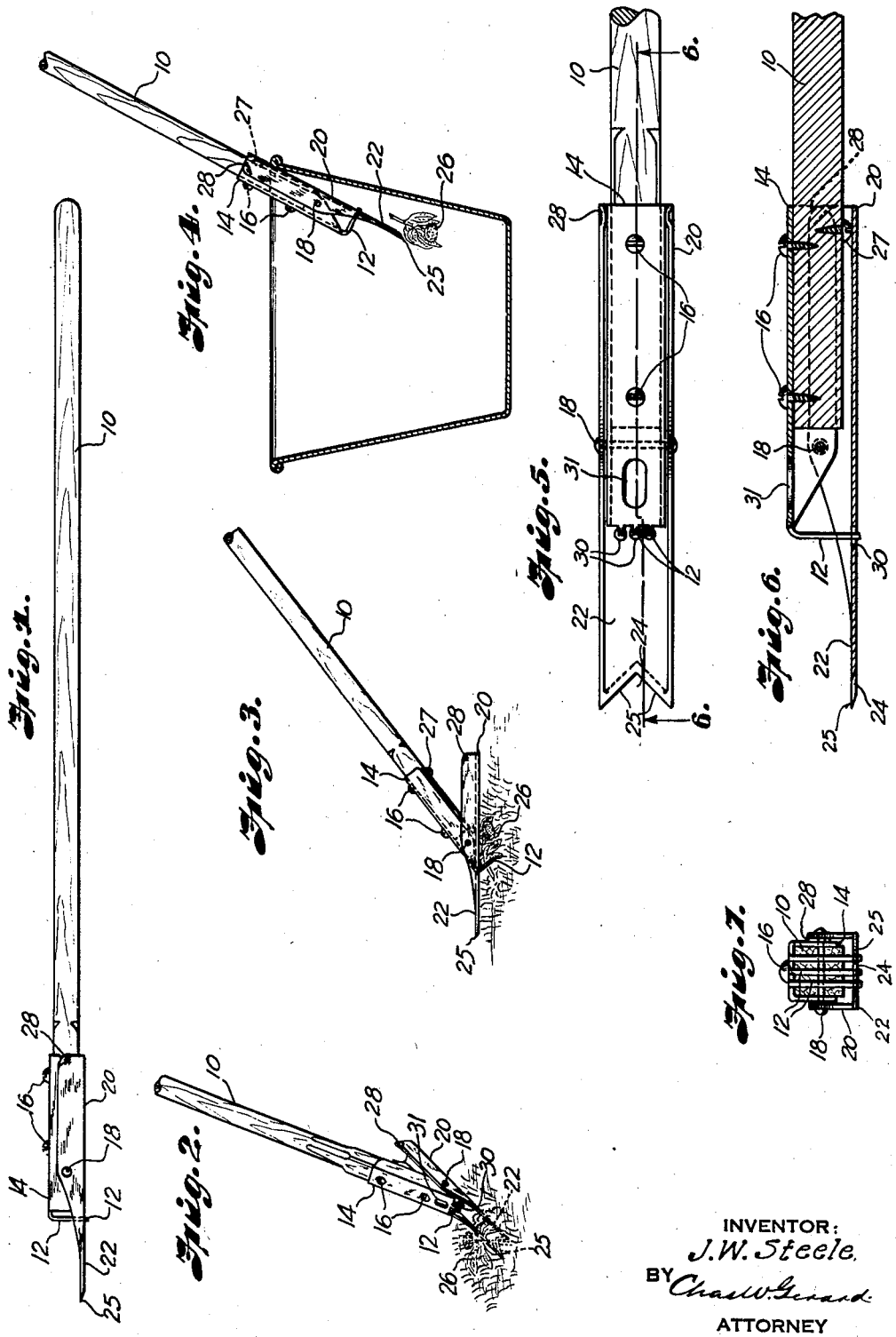
INVENTOR:
J. W. Steele,
BY Chas W. Gerard
ATTORNEY Patented Mar. 17, 1942

2,276,746

UNITED STATES PATENT OFFICE 2,276,746

WEED DIGGING AND GATHERING TOOL

James W. Steele, North Kansas City, Mo.

Application May 17, 1939, Serial No. 274,122

2 Claims. (Cl. 7—14.3)

The present invention relates to weed cutting or digging devices, and aims to provide an improved form of tool which is particularly useful and efficient for the cutting and gathering of plants such as dandelions, which are especially difficult to contend with in the care of lawns.

To this end I have devised an implement which is designed to promote the speedy cutting and gathering of such plants in an easy and convenient manner, by operation of cutting the plants below the ground surface, raking and lifting them for collection within a receptacle in which the movement operates to automatically strip the plant from the tool and leave it in the receptacle—all without requiring any laborious bending or stooping on the part of the operator.

For accomplishing such purposes, the improved construction comprises a handle carrying a pivoted digging or spading member and also a set of rake teeth, and in such a relation to the digging member that the latter shields or guards the teeth of the rake portion when not in use, and neither the digging member or the teeth interfere with each other's operation for digging or raking; and moreover the pivotal movement of the digging member serves automatically to strip the plants off the rake teeth to deposit them in the receptacle.

The improved device further comprises a minimum number of parts adapted to be manufactured economically and assembled in neat and compact relation.

With the foregoing general objects in view, the invention will now be described in detail by reference to the accompanying drawing showing a preferred form of construction embodying the improvements, after which those features and combinations deemed to be novel and patentable will be particularly set forth and claimed.

In the drawing—

Figure 1 is a side elevation showing an implement constructed in accordance with the invention;

Figure 2 is a perspective view illustrating the digging or plant cutting and removing construction of the implement;

Figure 3 is a side view showing the operation of raking or gathering the plants after they are cut;

Figure 4 is a similar view showing the operation of stripping the plant off the tool for collection within a receptacle;

Figure 5 is an enlarged plan view of the working parts of the tool;

Figure 6 is a sectional view representing a section taken on the line 6—6 of Figure 5; and Figure 7 is a cross section taken on the line 7—7 of Figure 5.

The care of most lawns involves the necessity of eliminating the growth of various sorts of weeds, such as dandelions and other species which multiply so rapidly as to soon get beyond control unless prompt measures are taken to eradicate them. Various tools have been devised and used for this purpose, and some of these are very useful and effective but depend for the most part upon a gripping action for clasping the plants after they are cut, whereby they are held by a movable arm or finger against the digging or cutting blade until released and dumped into a receptacle. I have found the most common form of such tools more or less objectionable because of the difficulty of efficiently removing and collecting the plants by a proper raking or gathering action by means of the use of such tools, and frequently the lawn is left scarred and uneven because of too much soil being removed along with the plants.

In the present construction no clamping or grasping means is used, but a combination of digging or cutting, raking, and discharge or stripping means, for digging, gathering and dumping the plants into a receptacle.

Accordingly, the improved device comprises a handle member 10 of any suitable length, to the lower end of which is attached a metallic rake device consisting of several transversely extending teeth or prongs 12, said rake having a channel-shaped shank portion 14 secured by screws 16 or the like to the end of the handle, as clearly represented in Figure 6.

Opposite the end of the handle 10 is pivoted, as by means of a suitable pin or rivet 18, a metal spading or digging member having an upper channel-shaped shank portion 20 adapted to embrace the sides of the shank portion 14, said rivet or pin 18 extending through the overlapping sides of the two shanks 14 and 20, see Figures 5 and 7. The sides of the digging or spading member taper off toward the lower end of the tool, which thus takes the form of a spading or cutting blade 22 terminating in a V-shaped fork, as indicated at 24, provided with beveled cutting edges 25; and preferably these edges 25 are beveled (see Figure 5) from their under side (considering the working position of the tool as represented in Figure 2), thus tending to produce a slight lifting movement during the spading or digging action for correspondingly lifting the weed or plant 26. By reference to Figures 2 and 4, it will be seen that the digging or spading member can swing about the pivot 18 into either open or working position (Figure 2) or closed or plant stripping position (Figure 4), for which closing movement a stop screw 27 may be provided on the handle inside the upper end of the shank 20. The sides of said shank 20 may also be suitably formed to provide spring latching elements 28 for frictional engagement with the sides of the shank 14, for yieldingly holding the member 20 in said closed position.

For clearing the teeth or prongs 12 during said movements of the pivoted spading member, as well as effecting the plant stripping function, said pivoted member is provided with a set of openings 30 through which the teeth or prongs 12 project throughout said movement, the length of the prongs being such as to remain substantially shielded or guarded when the pivoted member is closed, as represented in Figures 1 and 6. The openings 30 are not only of sufficient size to clear the teeth or prongs throughout said movement, but the points of the teeth preferably rest against the edges of the openings when the pivoted member is closed, for bracing the teeth against any casual bending action when the tool is not in use (see Figure 6).

The manner of using and operating the improved implement will be clearly understood from the illustrations given in Figures 2, 3 and 4. The pivoted digging or spading member 20 may be opened by hand or by striking its lower end upon the ground, and the forked end 24 then driven into the soil for cutting the plant 26 below the ground surface. This requires no bending or stooping on the part of the operator, and if necessary, pressure may be applied by foot to the upper end of the pivoted member 20 for penetrating the ground. In this operation the bottom bevel of the fork 24 helps to lift and free the plant, so that it may be more readily removed. After cutting, the blade 22 is withdrawn and the tool simply operated as a rake, the teeth or prongs 12 being already exposed, and all that is necessary is to lower the handle sufficiently to rake the teeth 12 over the severed plant so that it may be engaged by the teeth and transferred to a bucket or other receptacle 32. To dump the plant into the receptacle, the operator simply strikes the upper end of the pivoted member 20 against the side of the receptacle for closing the working end of the tool, whereby the lower end of said member operates as a stripper for pushing the plant off the teeth of the rake, and thereby discharging the plant into the receptacle, as illustrated in Figure 4.

An opening 31 is provided in the shank portion of the rake member to help prevent choking up of the space back of the rake teeth 12 as well as to afford access to said space for keeping it clear of obstruction.

It is thus apparent that a practical and efficient device, without any complications in structure, is provided for performing an otherwise laborious task, and that in the use of the improved tool it may be operated with one hand, and all bending or handling of the plants is eliminated, as it is not required to stoop down for the purpose of removing, picking up or dumping of the weeds into the receptacle.

The improved device further facilitates the operation by a manipulation in practically one direction after severing the plant, since the raking and transfer to the receptacle and the stripping of the plant by striking the side of the receptacle, may all be carried out by an operation in the same general direction, as will be seen by a comparison of Figures 2, 3 and 4.

It will thus be seen that I have devised an implement possessing several features of advantage and improvement in both construction and operation, and while the foregoing sets forth what I have found to constitute one meritorious form of embodiment of the proposed improvements, I desire to be understood as reserving the right to make all changes or modifications which may fairly be construed as falling within the spirit and scope of the appended claims.

What I claim and desire to secure by Letters Patent is:

1. A plant cutting and gathering tool comprising a handle, a rake device formed with teeth and having a channel-shaped shank portion embracing and secured to one end of said handle with said teeth extending transversely across the axis of the handle, and a spading or digging member having a forked cutting terminal and a channel-shaped shank portion embracing the sides of said rake shank portion and pivoted thereto for movement about an axis intersecting said handle axis and at right angles to said rake teeth, said spading member extending normally in a plane parallel to the axis of said handle but spaced therefrom and provided with openings permitting the passage of the rake teeth therethrough when said spading member is pivoted to expose said teeth for the raking operation, said openings registering substantially flush with the ends of said teeth when said spading member is in said normally parallel relation to said handle axis.

2. A plant cutting and gathering tool comprising a handle, a rake element rigidly secured to one side of said handle and having teeth extending transversely of the axis of the handle and below the lower end thereof, a spading element of substantially straight form at the opposite side of said handle and pivoted thereto for movement about an axis intersecting said handle axis and at right angles to said rake teeth, and means for latching said spading element in spading position parallel to the axis of the handle, said spading element having openings accommodating the points of said rake teeth and guarding the same when said spading element is in operative or spading position while also permitting passage of said teeth through said openings when said spading element is pivoted to expose said teeth for the raking operation.

JAMES W. STEELE.